(12) United States Patent
Shendge et al.

(10) Patent No.: US 12,169,438 B2
(45) Date of Patent: Dec. 17, 2024

(54) DELIVERING FILE SYSTEM NAMESPACE FEATURES WITHOUT ON-DISK LAYOUT CHANGES

(71) Applicant: Dell Products L.P.

(72) Inventors: Geetha Shendge, San Jose, CA (US); Shashikanth Lakshmikantha, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 108 days.

(21) Appl. No.: 18/182,570

(22) Filed: Mar. 13, 2023

(65) Prior Publication Data

US 2024/0311248 A1    Sep. 19, 2024

(51) Int. Cl.
*G06F 11/00* (2006.01)
*G06F 11/07* (2006.01)
*G06F 11/14* (2006.01)
*G06F 16/185* (2019.01)
*G06F 16/901* (2019.01)

(52) U.S. Cl.
CPC ...... *G06F 11/1435* (2013.01); *G06F 11/0727* (2013.01); *G06F 16/185* (2019.01); *G06F 16/9027* (2019.01)

(58) Field of Classification Search
CPC ............. G06F 11/0727; G06F 11/1435; G06F 16/185; G06F 16/9027
See application file for complete search history.

(56) References Cited

U.S. PATENT DOCUMENTS

| 5,202,986 | A | * | 4/1993 | Nickel | G06F 16/9027 |
| 7,590,632 | B1 | * | 9/2009 | Caronni | G06F 9/52 |
| | | | | | 719/330 |
| 7,941,709 | B1 | * | 5/2011 | Hong | G06F 16/13 |
| | | | | | 714/54 |
| 8,495,111 | B1 | * | 7/2013 | Wang | G06F 3/0644 |
| | | | | | 707/823 |
| 2010/0211611 | A1 | * | 8/2010 | Horn | G06F 16/213 |
| | | | | | 707/E17.012 |
| 2010/0293279 | A1 | * | 11/2010 | Saika | H04L 67/1001 |
| | | | | | 709/226 |
| 2012/0331007 | A1 | * | 12/2012 | Billa | G06F 16/9024 |
| | | | | | 707/E17.012 |
| 2016/0021043 | A1 | * | 1/2016 | Modi | H04L 45/44 |
| | | | | | 709/206 |
| 2017/0118232 | A1 | * | 4/2017 | Zhou | H04L 63/1458 |
| 2019/0005154 | A1 | * | 1/2019 | Tripathi | G06F 18/217 |
| 2020/0125732 | A1 | * | 4/2020 | Iyer | G06F 11/3612 |

(Continued)

*Primary Examiner* — Joshua P Lottich
(74) *Attorney, Agent, or Firm* — Dergosits & Noah LLP; Todd A. Noah (57) ABSTRACT

Delivering file system namespace features without on-disk layout changes is described. An iterator in a file system identifies an anomaly in a hierarchical data structure, which includes a root node at a highest level in a file set, includes directories of connected nodes corresponding to other levels in the file set, and includes leaf nodes at a lowest level in the file set. The iterator stores an annotation, about the anomaly, into an in-memory storage that is external to the file system. An asynchronous agent in the file system identifies the annotation, about the anomaly, which is stored in the in-memory storage, thereby enabling the asynchronous agent to correct the anomaly.

20 Claims, 7 Drawing Sheets

(56) References Cited

U.S. PATENT DOCUMENTS

| | | | |
|---|---|---|---|
| 2020/0364105 A1* | 11/2020 | Carey | G06F 16/1727 |
| 2021/0160053 A1* | 5/2021 | Yang | H04L 9/0643 |
| 2021/0182245 A1* | 6/2021 | Shemer | G06F 16/1844 |
| 2022/0138039 A1* | 5/2022 | Chawla | G06F 11/0709 |
| | | | 714/4.3 |
| 2022/0229903 A1* | 7/2022 | Manevitz | G06F 17/16 |
| 2022/0261386 A1* | 8/2022 | Negi | G06F 16/2343 |
| 2023/0025059 A1* | 1/2023 | Bohra | H04L 1/18 |

* cited by examiner

| Hint Type | Key | Value | Consumer |
|---|---|---|---|
| SPARSE_DIR | <mid_DIR_CACHE> | <pid, cid, time> | Directory Caching Service |
| NEEDS_COMPACTION | <mid_DIR_COMPACTION> | <pid, cid, time> | Directory Compaction Service |
| PAGES_READ_PER_LOOKUP | <mid_DIR_LOCALITY_REPAIR> | <pid, cid, time> | Locality Repair Service |
| EXCEEDS_NVLOG_LIMIT | <mid_NVLOG_OUT_OF_SPACE> | <mid, logsize, time> | AI/ML pattern detection Service |

DELIVERING FILE SYSTEM NAMESPACE FEATURES WITHOUT ON-DISK LAYOUT CHANGES

TECHNICAL FIELD

This disclosure relates to processing digital information, and more particularly, to delivering file system namespace features without on-disk layout changes.

BACKGROUND

A data object can be defined as a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

In computing, a file system or filesystem is a data structure and the logical rules that an operating system uses to store, manage, and retrieve groups of data objects and the names of the groups of data objects. By organizing data objects into groups and giving a name to each group of data objects, a file system can isolate, identify, process, backup, and restore data objects. Availability and performance are two critical features required in file systems used for backup purposes. A significant aspect of a file system design, such as a Data Domain file system, is namespace management, which is a composite of file and directory manager services. A namespace can be a set of identifiers (known as names) that are used to refer to distinct types of objects while avoiding identifier collision between multiple objects that use the same identifier.

Namespaces are commonly structured as hierarchies to allow reuse of identifiers in different contexts, which ensures that all of a given set of data objects have unique identifiers so that each data object may be distinctly identified. For example, within the namespace of a family named Smith, the given name John is sufficient to uniquely identify a person named John Smith even though people who have other family names may also have the given name John. Prominent examples of using namespaces include file systems, which assign names to files, and hierarchical file systems which organize files in directories, so that each directory is a separate namespace, such that the directory "letters" and the directory "invoices" may both include a file named "to_jane".

Features that can improve availability and performance in a namespace may be delayed many times because the features require not only on-disk changes for a file system, but also require the resulting layout upgrades and consistency verification changes. File system users may regularly encounter issues in the field, such as in the form of a file system's client timeout. Since complexity and longer development time are required to reach the market with on-disk changes, alternative resolutions of such issues for customers have resulted in inefficient workarounds rather than providing a holistic correction of the root cause(s) of a problem. Even such an expedited approach is not optimal because customer systems still require downtime in most cases of quick fixes.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

In some embodiments, a system (and a computer program product and a method) is described for delivering file system namespace features without on-disk layout changes. An iterator in a file system identifies an anomaly in a hierarchical data structure, which includes a root node at a highest level in a file set, includes directories of connected nodes corresponding to other levels in the file set, and includes leaf nodes at a lowest level in the file set. The iterator stores an annotation, about the anomaly, into an in-memory storage that is external to the file system. An asynchronous agent in the file system identifies the annotation, about the anomaly, which is stored in the in-memory storage, thereby enabling the asynchronous agent to correct the anomaly.

For example, a read directory operation executes on a namespace, which evaluates the directories in the namespace for sparseness, and identifies multiple directories as sparse directories. Then the read directory operation stores an annotation about the sparse directories in the namespace into a key value store. A directory caching service accesses the key value store, identifies the annotation about the sparse directories in the namespace, and caches the sparse directories into a directory cache, without requiring any on-disk layout changes.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

A file system's namespace may be implemented by a Merkle tree, referred to as a mtree, which is a set of files that can function as a mount point. Each mtree file set is a practically standalone file system inside a larger file system that encloses the file set. As many as 256 of these separate mtree file sets can exist in each instance of a file system.

Figure 1:
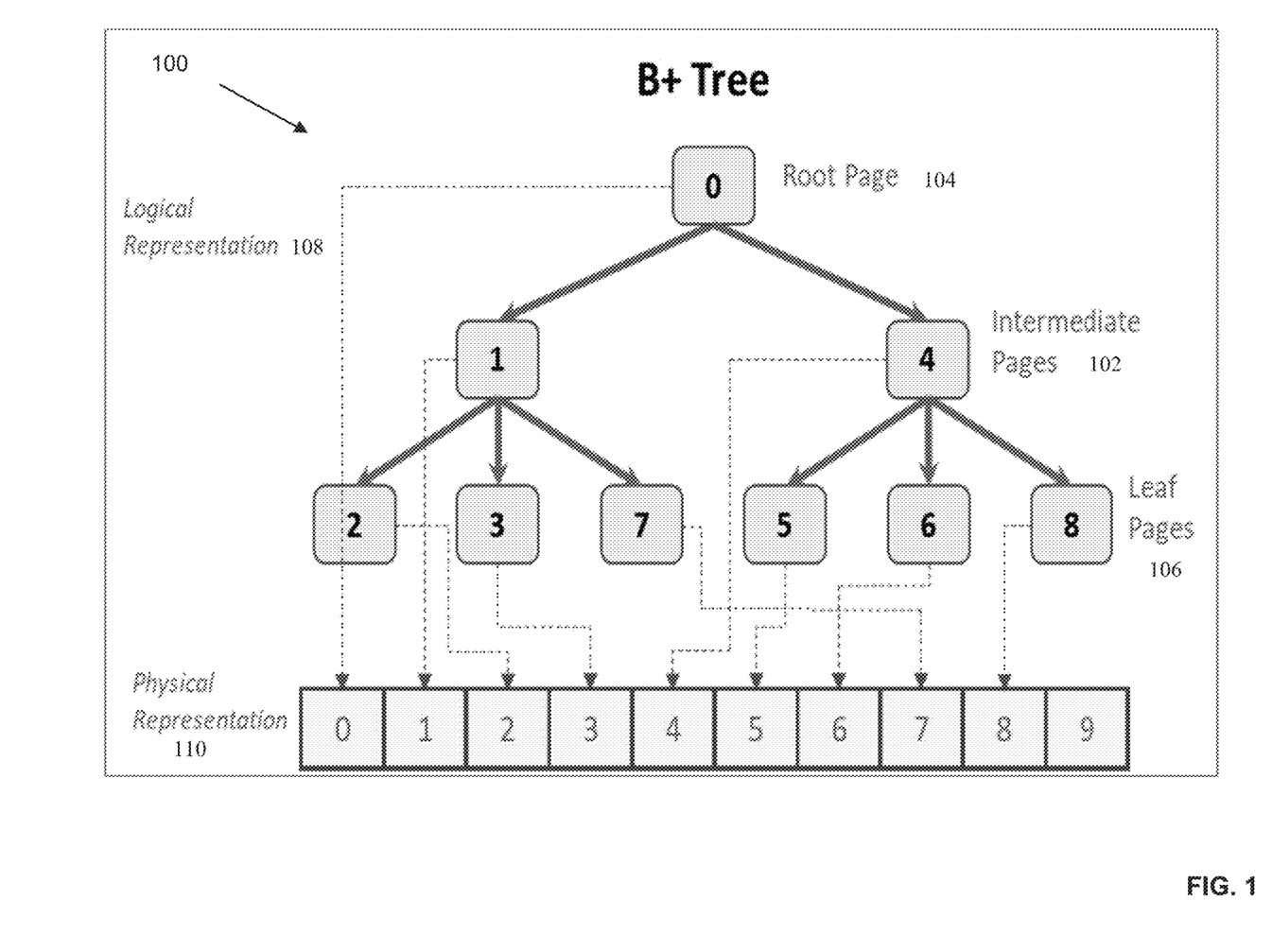
FIG. 1 is a block diagram illustrating an example B+ tree for delivering file system namespace features without on-disk layout changes according to one or more embodiments of the disclosure.

An mtree file set may be represented internally as a B+ tree with 3 intermediate levels, but for simplicity the example B+ tree 100 in FIG. 1 depicts a single intermediate level of intermediate pages 102 between the root page 104 and the leaf pages 106. A B+ Tree is a balanced tree of fixed depth, and each node in a B+ tree may be a fixed size "page" of 64 kilobytes (KB), with pages referring to each other via a page number, such as pages numbered 0-8. A logical representation 108 of a B+ tree may be physically represented 110 as a linear area of pages which is stored in persistent storage such as a disk. Since the B+ tree 100 in flattened form is essentially just a single linearly addressed segment of space, the B+ tree 100 may be traversed quickly for certain operations.

The actual file metadata may be contained in a B+ tree leaf page. The leaf page itself can contain key/value pairs in the traditional sense. A key may be a 128-bit number kept in sorted order in the leaf page, and accompanied by a value, which may be an index to data associated with the key. The 128-bit key may be composed of a 64-bit parent file identifier (PID) and 64-bit child file identifier (CID), which may be the inode number of the actual file.

A namespace's set of identifiers that are used to refer to distinct types of data objects typically include index nodes, referred to as inodes. An inode can be a data structure in a Unix-style file system that describes a file-system object, such as a data file or a directory. Each inode stores the attributes and disk block locations of an object's data. File-system object attributes may include metadata, such as the times of the last change and the last access, as well as owner and permission data. A directory could be a list of inodes with their assigned names, with the list including an entry for itself, its parent, and each of its children.

In some file systems, such as the Data Domain operating system 5.7 and later, four keys are created for each file, including the child key, which can contain inode type information, a "dirent" key, which can contain a file's name, and two hash keys. The cs hash key can contain a hash of a file's name in a case-sensitive way, and the ci hash key can contain a case-insensitive hash of the same file's name. The child key can only be involved in filtering the other PID:CID keys since these keys are near the child key. Those keys which are in PID:hash format are typically located elsewhere in a B+ tree for a given file.

A namespace may be stored in a B-tree, which can be a self-balancing computer data structure that maintains sorted data and allows searches, sequential access, insertions, and deletions in logarithmic time. The B-tree generalizes the binary search tree, allowing for nodes with more than two children. Unlike other self-balancing binary search trees, a B-tree is well suited for storage systems that read and write relatively large blocks of data, such as disks. The term B-tree may refer to a specific design or to a general class of designs. In the specific design sense, a B-tree stores keys in its internal nodes, but does not need to store those keys in the records at the leaves.

Figure 2:
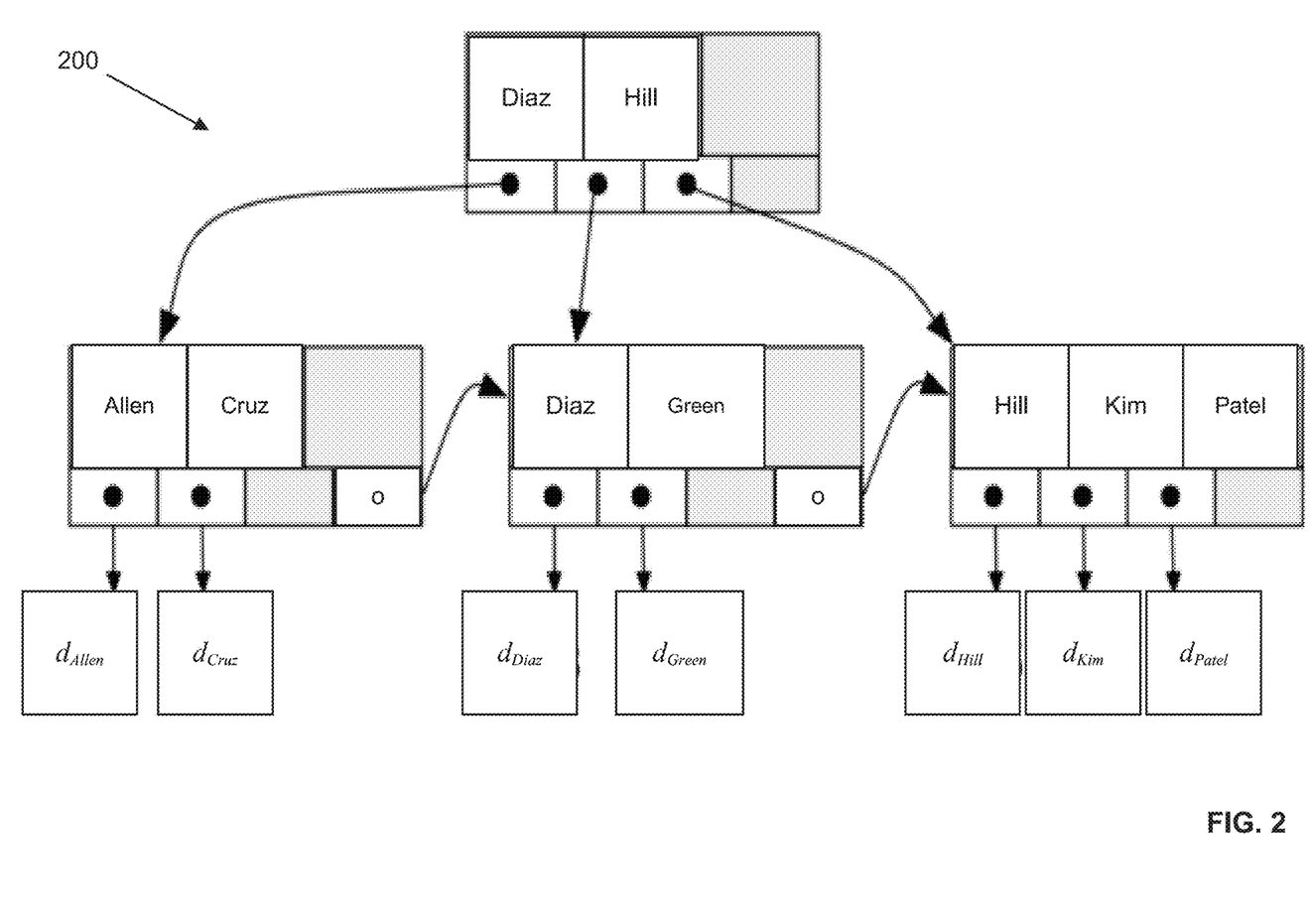
FIG. 2 is a block diagram illustrating another example B+ tree for delivering file system namespace features without on-disk layout changes according to one or more embodiments of the disclosure.

The general class of a B-tree includes variations such as a B+ tree, in which copies of keys are stored in the internal nodes, the keys and records are stored in leaves, and a leaf node includes a pointer to the next leaf node to speed sequential access, as illustrated by the example of a B+ tree 200 depicted by FIG. 2. The B+ tree 200 stores the namespace for employee files which are accessed using each employee's family name, which are the keys for accessing the files by employee name, and links the keys Allen-Patel to data values $d_{Allen}$-$d_{Patel}$, with the leaf nodes' links enabling rapid in-order traversal. A B+ tree can be viewed as a B-tree in which each node can have a large number of children and contain only keys (not key-value pairs), and to which an additional level is added at the bottom with linked leaves. The primary value of a B+ tree is in storing data for efficient retrieval in a block-oriented storage context, particularly file systems. This greater efficiency than binary search trees is primarily because B+ trees have high fanout, which is the number of pointers to child nodes from a node, typically about 100 or more, with the high fanout reducing the number of input/output (I/O) operations required to find an element in the tree.

Embodiments of this disclosure provide a mechanism that stores crucial filesystem hints or namespace annotations in a non-file system location, such as an external key value store (KVS), thereby delivering new filesystem features without making an on-disk layout change. Namespace annotations, or simply annotations, have no impact on correctness, but may be used to add new features and various optimization tasks that execute on a namespace. If such an annotation is lost, this loss has no bearing on the filesystem functionality.

The format of a namespace annotation may be checked, but this checking is not necessary. Such annotations provide optional hints, and existence checks are needed only when processing an annotation. A namespace annotation may be retrieved by different filesystem services to take necessary actions to improve system behavior at the level of file sets and at the levels below file sets, and any file system service can make use of such annotations.

For an example, a staging directory is a directory used in traditional backup clients, such as Networker or Avamar, in which backup files are created and stored temporarily before being moved to a permanent backup directory. During a file creation there are four records that are created for a file: an inode, a directory record (dirent), a case sensitive hash (cs_hash), and a case insensitive hash (ci_hash). When a file is renamed, and the destination parent directory is not the same as the source parent directory, then three records, namely the dirent, cs_hash and the ci_hash are deleted from the source parent directory and are created in the destination parent directory. When numerous files in a source directory are moved to a different directory, the source directory has a significant number of inodes, which makes it a large directory with a large number of inodes and very few directory records (dirents), thereby making the source directory into a sparse directory. When a read directory (readdir) operation is subsequent executed, the read directory operation only looks for dirents and subsequently reads through many pages that are filled with only inodes, which can cause a timeout because the system is spending a significant amount of time accessing multiple hard disk locations while looking for relatively few dirents.

One solution to this problem could be to make on-disk changes to accumulate directory statistics that could be used to identify sparse directories, so that a significant amount of time is no longer spent accessing many disk locations to identify only a few dirents. Alternatively, when a sparse directory is detected during a directory listing or B+Tree iteration, embodiments of the system described in this disclosure can add a namespace annotation which may be identified and used by a directory caching service to identify and cache any sparse directories, without requiring any on-disk filesystem layout changes.

Annotations are namespace hints that are stored in an alternate storage device such as a key value store (KVS), thereby precluding the need for any on-disk changes. An annotation is an optional hint that may be used by a file system at a later point in time to make the system more efficient. Losing this information should have no effect on the existing state of a file system. Correctness checks are not needed, although format checks may be added while consuming namespace annotations.

Figure 3:
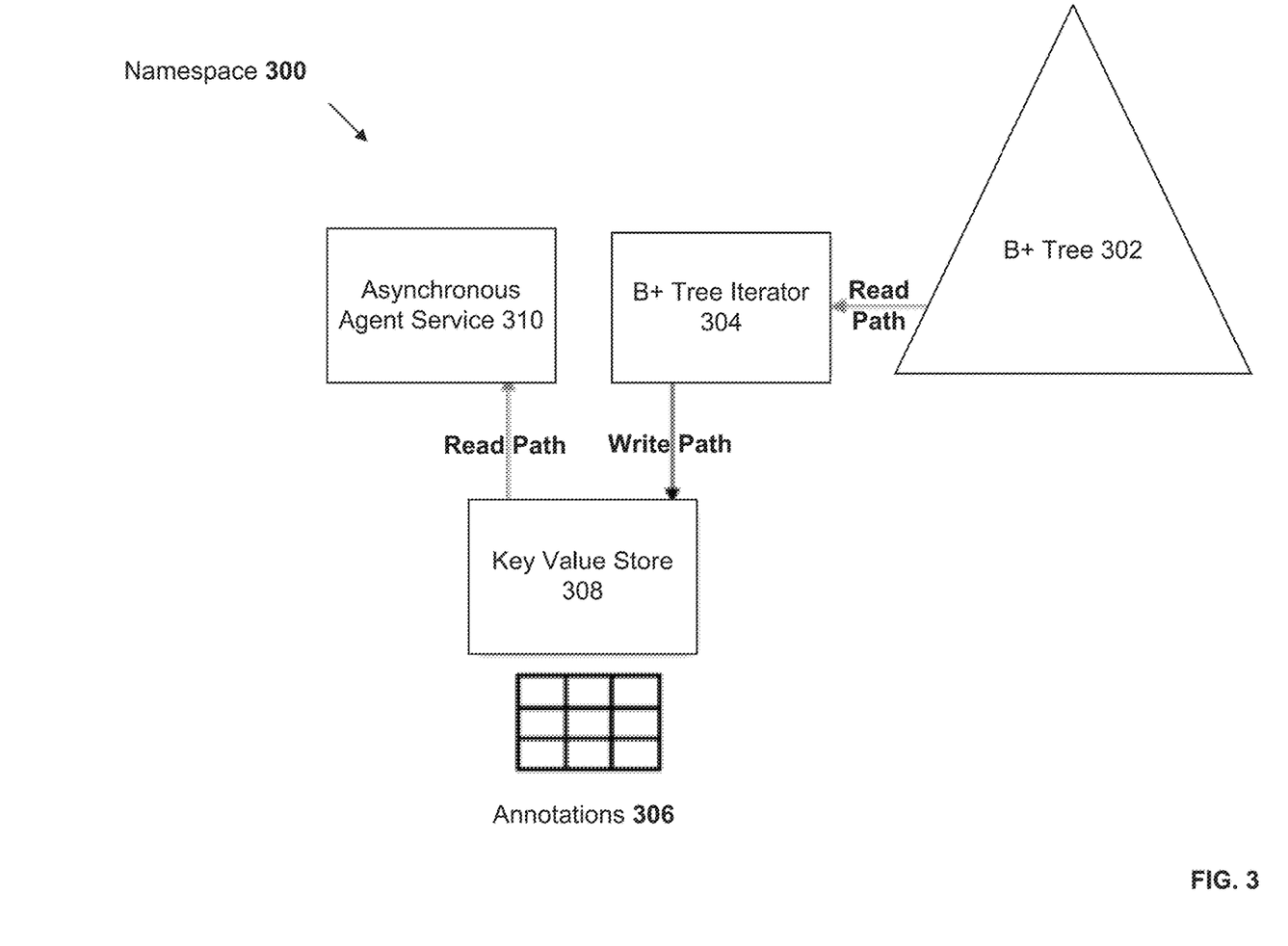
FIG. 3 is a block diagram illustrating an example namespace file system for delivering file system namespace features without on-disk layout changes according to one or more embodiments of the disclosure.

The block diagram in FIG. 3 depicts a namespace 300 consisting of a B+Tree 302 which may be walked by any of many different types of iterator 304. Once an anomaly is detected, the iterator 304 writes a namespace annotation 306 into the key value store 308 or some other alternative and external data storage. An asynchronous agent service 310 is continuously polling the key value store 308 for relevant namespace annotations 306 at regular intervals and consumes a namespace annotation 306 to correct the issues observed in the file system or namespace 300. The asynchronous agent service 310 subsequently removes the namespace annotation 306 from the key value store 308 or alternative and external storage.

Figure 4:
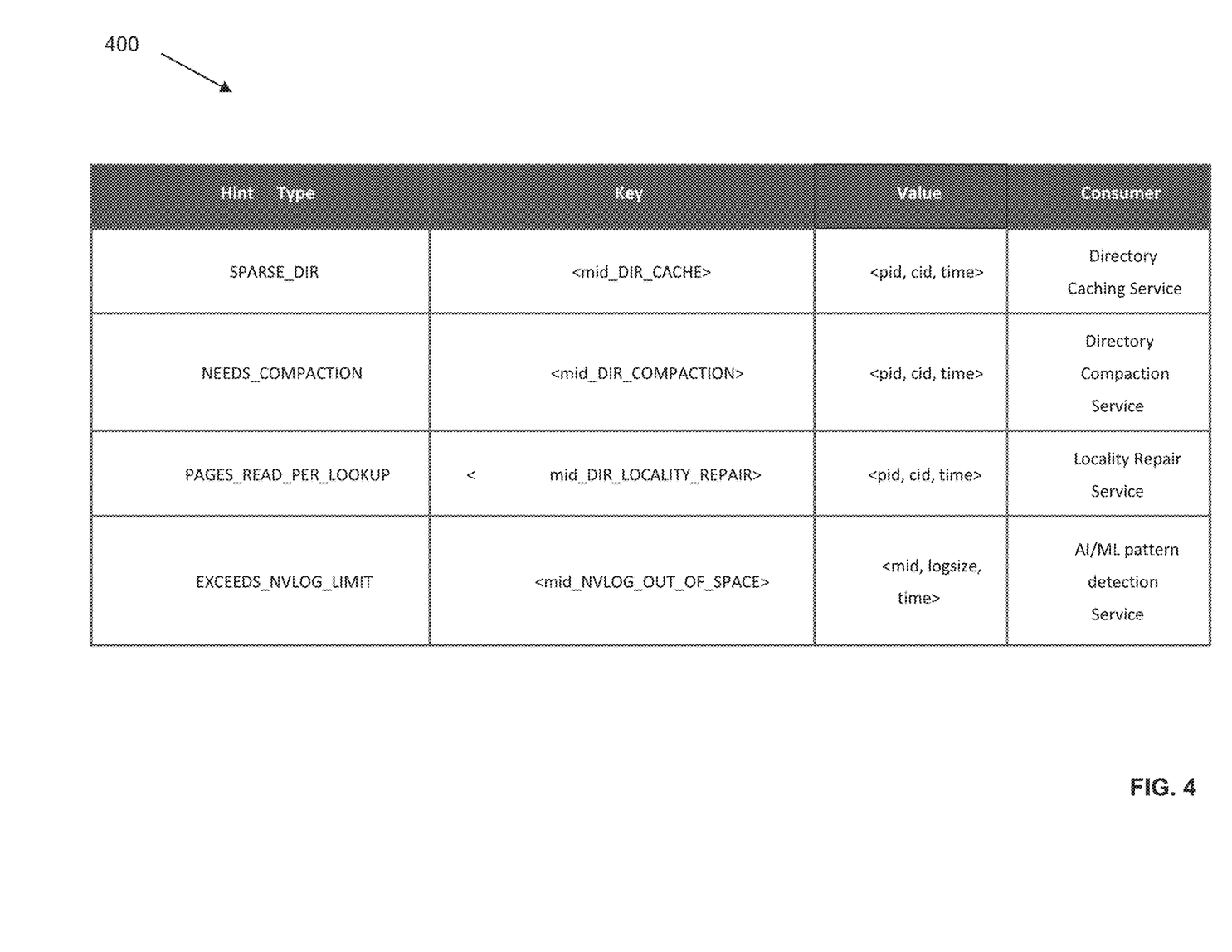
FIG. 4 is a block diagram illustrating an example table for delivering file system namespace features without on-disk layout changes according to one or more embodiments of the disclosure.

FIG. 4 depicts an example of the contents 400 of the key value store 308 which stores the namespace annotations 306. The contents 400 include the hint type, the key, the value, and the consumer for the various namespace annotations that are applied to directories and their nodes. For example, the directory caching service responds to a namespace annotation which indicates whether a directory is sparse, the directory compaction service responds to a namespace annotation which indicates whether a directory's nodes need compaction, the locality repair service responds to a namespace annotation which indicates whether a directory's nodes are fragmented, and the artificial intelligence/machine-learning system responds to a namespace annotation which indicates a pattern of non-volatile log flushing data to hard disks at an increased rate.

When a client creates a lot of files and then later deletes many of these files in bulk, the file system's directory manager creates holes in the B+Tree's pages that represent these files, such that these pages need to be compacted for efficient read and lookup operations. Traditionally, compaction worked only at the highest level, which is a root node for a mtree that represents a namespace, but not lower at the directory level. The percentage of dead entries in a few directories in a namespace might be insignificant at the mtree level, thereby resulting in compaction not executing at the mtree level, but these percentages may be large enough at the lower levels for these directories to cause performance degradation in read directory operations. For example, if the percentage of dead entries is large in only 1 directory of more than 100 directories in a mtree, the relatively small percentage of dead entries in the mtree will not trigger compaction for the mtree because 99 of its 100 directories are relatively unaffected, whereas the relatively large percentage of dead entries in the 1 directory will trigger compaction for the 1 directory.

Without namespace annotations, compaction would not even execute because the mtree may not qualify for compaction even if the sub-mtree (directory) may qualify, such as if the directory might experience sub-optimal performance without compaction service. To solve this without namespace annotations would requires an on-disk change to flag directories that needs compaction. With namespace annotations, as soon as any type of iterator can identify a directory that needs compaction, the system adds an namespace annotation which may be identified by a compaction service, without requiring any on-disk filesystem layout changes. An additional benefit is that compacting on a per-directory level would make the read directory operation have a latency that is proportional to the number of directory records (dirents).

A directory is represented by the tuple <parent, child> . . . <PID,CID> in short. The system detects an anomaly by reading a directory, Is-1<PID,CID>. Then the system checks if the directory could benefit from a compaction service.

If the directory is a compaction candidate, the system logs a namespace annotation in the key value store—Key: <mtreeid_DIR_COMPACTION>, value: <PID, CID, time>. Later, the system reads the namespace annotation from the key value store's <key:value>, processes the required compactions, and subsequently deletes namespace annotations as a post-compaction service. The following represents processing an annotation in a compaction service and deleting the annotation post-compaction.

```
For each mid {
    // Get all Compaction annotations
    prefix = mid_DIR_COMPACTION;
    List(key, value) = annotation_prefix_search(prefix);
    For each entry in List {
        list_entry = list.get( );
        pid = list_entry.value.pid;
        cid = list_entry.value.cid;
        Time = list_entry.value.time;
        ns_dir_compaction(pid,cid, time); // per-directory compaction
        annotation_remove(list_entry);
    }
}
```

Namespace annotations enable adding critical file system features to improve file system availability and performance with quick turnaround time without any file system on-disk change, as demonstrated by the creation of namespace annotations. When a directory listing operation is executed, the B+Tree pages of a directory are evaluated for sparseness. If the pages qualify for compaction, a count of the number of such pages is maintained and is compared against a threshold to check if the directory is a compaction candidate. If the directory is a compaction candidate, then the system can simply store the mtree and directory information into the key value store as a namespace annotation.

The compaction service executes periodically to check if any mtree needs compaction. This compaction service can read the namespace annotations from the key value store and then process directories that need compaction. The key value store's namespace annotation record is removed after processing the directory compaction. Nonexistence of the directory does not cause any harm because the compaction service checks for the existence of the directory identified by the annotation.

If an identified directory is not available to compact, then the annotation that identifies the directory may be safely removed from the key value store. The reading from a key value store could be optimized by the namespace annotations framework using an in-memory namespace annotations cache to store the key value store and speed up the read operation. The directory compaction API simply reviews the B+Tree pages of the directory <PID,CID> and validate its sparseness. If the directories are still sparse, the directory compaction performs the compaction.

The system can select locality repair (also known as defragmentation) targets. While reading just a few of a B+Tree's pages, the system could be reading a disproportionate number of physical disk blocks or containers, because the B+ Tree is fragmented with respect to container usage. This fragmentation can happen on a per-mtree or a sub-mtree level. For example, the pages hosting a directory may be severely fragmented with respect to containers but not at the mtree level, which dilutes the effect of one fragmented directory by the effect of multiple non-fragmented directories.

Traditionally, a directory might experience sub-optimal performance due to the absence of a locality repair service at the directory level. To solve this problem without namespace annotations, the system could have an on-disk change to flag directories that need defragmentation. The same fragmentation problem might be visible in non-directories as well. For example, a simple file lookup might have to traverse multiple intermediate levels of a B+Tree, each of which read a disproportionately large number of containers. With the benefits provided by namespace annotations, as soon as the system detects a mtree/directory/page that needs locality repair, the system adds a corresponding namespace annotation, which is subsequently identified by a locality repair service at any level, without an on-disk file system layout change.

A data processing engine can use artificial intelligence/machine learning systems to identify different types of anomalies, produce useful information, and store corresponding namespace annotations which record the useful information, which enables correcting the anomalies. The following example is based on an artificial intelligence/machine learning system detecting and potential patterns in flushing data from cache and predicting future events for increasing cache capacity.

A computer system can quickly read from cache memory and write to cache memory. An example of cache memory is a write cache, which provides a non-volatile log (nvlog) for logging a client system's operations. A write cache may be stored in non-volatile random-access memory (NVRAM) because non-volatile random-access memory provides for quick access times as compared to other means of data storage, such as disk storage. In additional to logging the client system's operations, the nvlog may also store metadata which describes the data contained within the nvlog.

While the nvlog provides for quick access time, the non-volatile log traditionally has had a lower storage capacity and limited read/write endurance. As such, the nvlog may be periodically flushed to a more permanent memory having higher storage capacity, such as hard disks, at points in time called consistency points. At any given point in time, the current view of a client system's computing operations and metadata may be viewed as data in the nvlog and in the permanent memory. Replication of the nvlog and permanent memory is desirable so that all computing operations data and metadata may be recovered should some or all of the computing operations data and metadata be lost for any reason.

Typically, computing operations data and metadata are replicated on a single partner computer system. The partner computer system will have access to both the nvlog and the permanent storage of the client system, which provides for a complete back up. The client system's nvlog may be replicated on a partner computer system's nvlog while the client system's permanent memory may be replicated on the partner computer system's permanent memory.

In order to avoid data loss or corruption, at any given point in time the nvlog of the client and the replicated nvlog located on the partner computer system should be consistent in-terms of the data and the metadata it contains. For this reason, the data and metadata are logged in a certain order and that order is maintained while the nvlog gets mirrored to the partner computer system. To ensure that data in the client system is consistent with data in the partner computer system, input/output I/O incoming to the client system is acknowledged after the data and corresponding metadata gets logged in non-volatile random-access memory locally and also in the partner computer system. In order to ensure that the data and corresponding metadata is logged in both the client system and the partner computer system, the following functionality is traditionally utilized: in-order placement of mirrored nvlog payload in the partner computer system's non-volatile random-access memory, completion of mirroring operation at the client system only after the corresponding payload has been placed in the partner computer system's non-volatile random-access memory, and completion of mirroring operation in the same order that it was issued.

Due to the large number of writes on a mtree, a flush operation is performed on a nvlog at an increasingly faster rate, which fills the nvlog very quickly. One solution is to record these instances in namespace annotations and use an artificial intelligence/machine learning system to analyze the namespace annotations to detect time-based patterns during which the system is likely to run out of nvlog space, and then to predict fill times and corresponding size increases for an nvlog per mtree. Then the system can dynamically increase the nvlog size when needed, and to return to the original size of the nvlog when the time-based patterns do not indicate the need for an increase in size for the nvlog.

Any of the devices, including the clients, servers, and hosts, in the operating environment can take the form of software, physical machines, or virtual machines, or any combination thereof, though no particular device implementation or configuration is required for any embodiment.

Similarly, data protection system components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data segments (or segments) such as may be produced by data stream segmentation processes, data chunks, data blocks, atomic data, emails, data files, contacts, directories, sub-directories, volumes, etc. In some embodiments, the terms "file," "data file." "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

Figure 5:
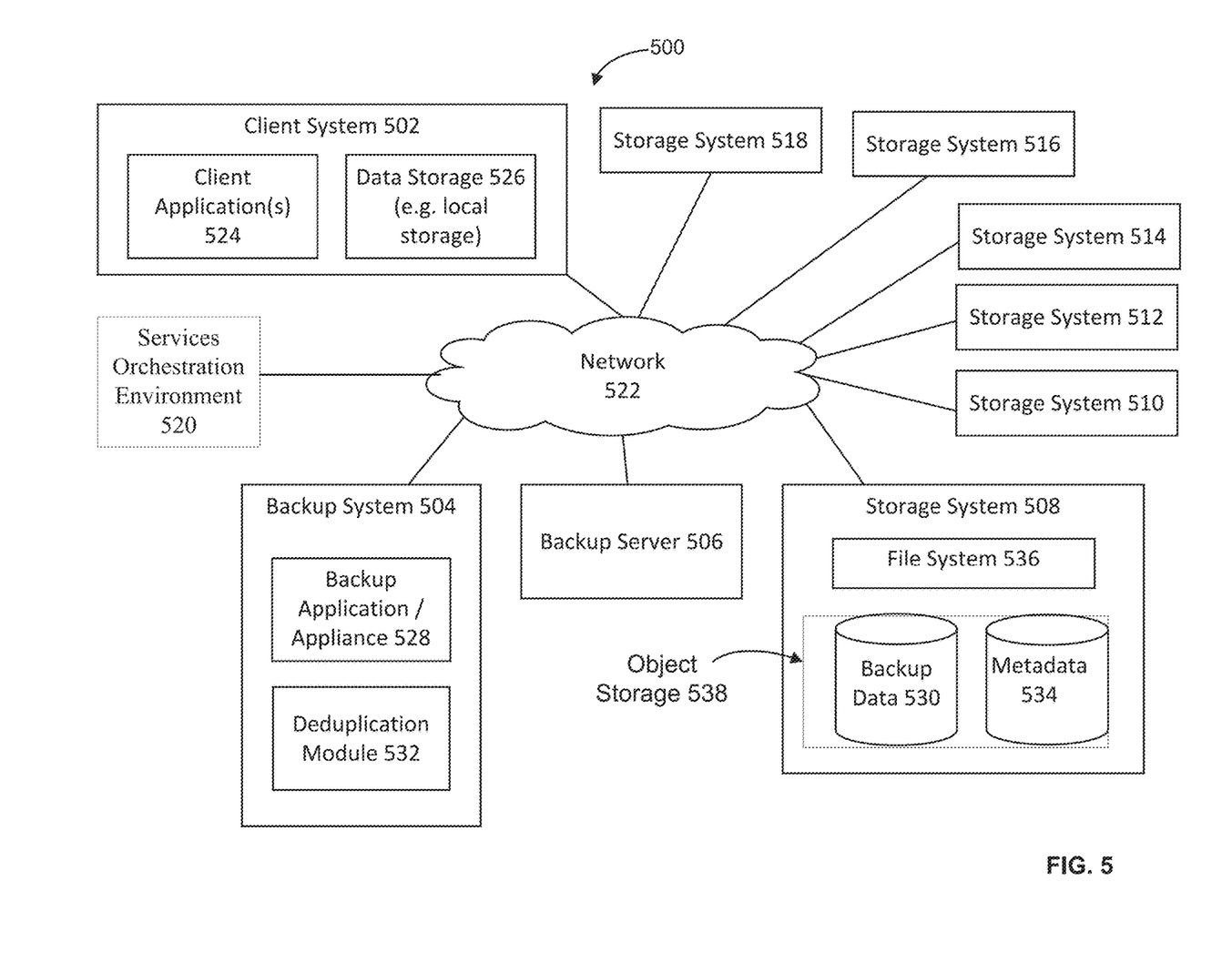
FIG. 5 is a block diagram illustrating an example operating environment for delivering file system namespace features without on-disk layout changes according to one or more embodiments of the disclosure.

More specifically, and with reference to FIG. 5, shown is a block diagram illustrating an example of an operating environment 500 for distributing phases of delivering file system namespace features without on-disk layout changes, according to one or more embodiments of the disclosure. As shown, the operating environment 500 may include a client system 502, a backup system 504, a backup server 506, a cluster of storage systems 508-518, and a services orchestration environment 520, which may interact via a network 522, which may be any type of wired or wireless network including a local area network (LAN), a wide area network (WAN), or a direct communication link, or other suitable connection.

As shown, the operating environment 500 may include a client or client system (or computer, or device) 502 that may be associated with a client or customer of a data backup and protection service, and the backup system 504 that may be associated with a data backup and protection service provider. For example, the client system 502 may provide computing resources (such as databases) for users (such as website visitors) of the customer, and data which may be protected by the backup and data protection service provider. Accordingly, the client system 502 may function as a client from which backups are performed. In some embodiments, the client system 502 may comprise a virtual machine.

In addition, the client system 502 may host one or more client applications 524, and may include data storage 526, as well as an interface for communicating with other systems and devices, such as the backup system 504. In general, the client applications 524 may create new and/or modified data that is desired to be protected. As such, the client system 502 is an example of a host device. The data storage 526 may be used to store client data, which may, along with the client system 502 (such as the client applications 524), be backed up using the backup system 504.

As further described herein, components of the client system 502 (such as the client applications 524 and the data storage 526) may be a data source, or be associated with one or more data sources such as a database, a virtual machine, and a storage device. In addition, components of the client system 502 may be data sources that are associated with the client system 502, but these components may reside on separate servers, such as a data server, or a cloud-computing infrastructure. The client system 502 may include a backup client application, or plug-in application, or Application Programming Interface (API) that cooperates with the backup system 504 to create backups of client data. The backed-up data can also be restored to the client system 502.

In at least one embodiment, the backup system 504 may represent one or more components of a Data Domain Restorer-based deduplication storage system, and a backup server 506 may be implemented in conjunction with a Data Domain deduplication storage server provided by Dell EMC for use with Data Domain Restorer storage devices. For example, the backup server 506 may be a stand-alone entity, or may be an element of the cluster of storage systems 508-518. In some embodiments, the backup server 506 may be a Dell EMC Avamar server or a Dell EMC Networker server, although no particular server is required, and other backup and storage system configurations are contemplated.

The backup system 504 may include a backup application (or appliance) 528 that performs, manages, or coordinates the creation and restoration of data that may be backed-up. For example, data to be backed-up from the client system 502 may be communicated from the client system 502 to the backup application 528 for initial processing, after which the processed data, such as backup data 530, is uploaded from the backup application 528 for storage at the cluster of storage systems 508-518. In some embodiments, the backup application 528 may cooperate with a backup client application of the client system 502 to back up client data to the cluster of storage systems 508-518. The backup application 528 may also cooperate with a backup client application to restore backup data from the cluster of storage systems 508-518 to the client system 502.

In some embodiments, the backup application 528 may be a part of, or work in conjunction with, a storage appliance. For example, the storage appliance may include a Dell EMC Cloud Boost appliance, although any suitable appliance is contemplated. In addition, the backup application 528 may provide a variety of useful functionalities such as source-side data deduplication, data compression, and WAN optimization boost performance and throughput, while also possibly reducing the consumption and cost of network bandwidth and cloud storage capacity.

One, some, or all, of these functions of the backup application 528 may be performed using deduplication logic via a deduplication module 532. For example, the deduplication module 532 can provide data segmentation, as well as in-flight encryption as the data is sent by the backup application 528 to the cluster of storage systems 508-518. However, as further described herein, in some embodiments, data deduplication may be performed entirely within the cluster of storage systems 508-518. It should be noted that the backup application (or storage appliance) 528 may be implemented in various forms, such as a virtual, physical, or native public cloud appliance to fit the requirements of a particular configuration, and the backup application 528 may be used with distinct types of data protection environments, including public and private object storage clouds.

The storage system 508, which is substantially similar to the storage systems 510-518, may store backup data 530

(backup files or backup objects) within a one or more computer nodes, as further described herein. As shown, the storage system 508 may also store metadata 534 for (or associated with) the backup data 530, and one or more instances of a filesystem 536 that catalogs backup files and other data residing in the clustered environment. In general, the storage of the backup data 530 may be configured to store data backups for the client system 502, which may be restored in the event of a loss of data.

The storage system 508 may be a file storage system or an object storage system that includes file storage 538 or object storage 538, as further described herein. Each storage system of the cluster of storage systems 508-518 may store backup data and/or metadata for the backup data within one or more computer nodes, and any combination of these computer nodes may be various types of computer nodes for a data center.

Figure 6:
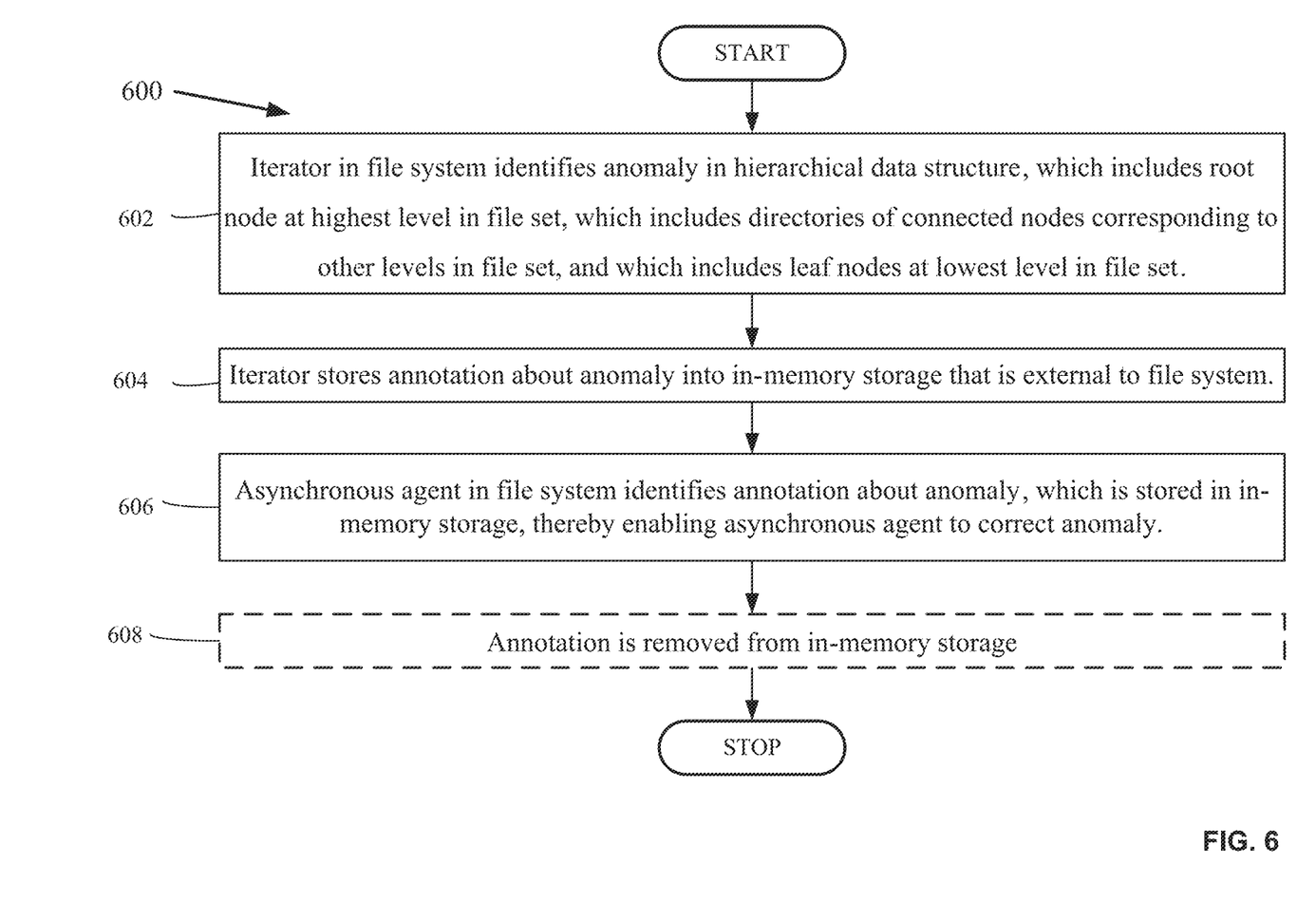
FIG. 6 is a block diagram illustrating an example method for delivering file system namespace features without on-disk layout changes according to one or more embodiments of the disclosure.

FIG. 6 is a flowchart that illustrates methods for delivering file system namespace features, without on-disk layout changes under an embodiment. Flowchart 600 illustrates method acts illustrated as flowchart blocks for certain steps involved in the client system 502, the backup system 504, the backup server 506, the cluster of storage systems 508-518, and/or the services orchestration environment 520 of FIG. 5. FIG. 6 depicts the flowchart 600 as a method for delivering file system namespace features without on-disk layout changes, with the method acts illustrated as flowchart blocks 602-608.

An anomaly in a hierarchical data structure, is identified by an iterator in a file system, wherein the hierarchical data structure includes a root node at a highest level in a file set, which includes directories of connected nodes corresponding to other levels in the file set, and also includes leaf nodes at a lowest level in the file set, block 602. The system identifies anomalies in a namespace file system. An anomaly identified by an iterator may be a sparse directory. For example and without limitation, this can include the read directory (readdir) operation executing on a namespace, thereby evaluating the directories in the namespace for sparseness, and identifying multiple directories as sparse directories.

An anomaly can be something that deviates from what is standard, normal, or expected. A hierarchical data structure can be a computer file system that is organized based on relative rankings of files. An iterator can be an object that enables a programmer to traverse a data structure, particularly lists. A file system can be data structure that an operating system uses to control how data is stored and retrieved. A root node can be a networked computational device which is the highest level in a tree structure, which has no parent.

A highest level can be a maximum position on a real or imaginary scale of amount, quantity, extent, or quality. A file set can be a group of computer resources linked by a defining property or common characteristic. A directory can be a file system cataloging structure which contains references to other computer files. A connected node can be a networked computational device. A lowest level can be a minimum position on a real or imaginary scale of amount, quantity, extent, or quality. A sparse directory can be a file system cataloging structure which contains thinly dispersed or scattered references to other computer files.

An anomaly identified by an iterator may be a directory of fragmented nodes, which are identified for defragmentation based on each number of nodes read from the directory of fragmented nodes for each read operation, compared to a threshold number. For example, a B+ tree iterator executes on a namespace, thereby evaluating the nodes in the namespace for fragmentation, and identifying multiple nodes as requiring defragmentation. A fragmented node can be a networked computational device that stores a file in different places on a disk rather than a continuous space. Defragmentation can be the process of consolidating a non-continuous file on a user's hard drive.

A number can be an arithmetical value, expressed by a word, symbol, or figure, representing a particular quantity and used in counting and making calculations. A node can be a networked computational device. A read operation can be a computer program getting information out of a computer file. A threshold number can be an arithmetical value, expressed by a word, symbol, or figure, representing a particular quantity and that must be exceeded for a certain reaction, phenomenon, result, or condition to occur or be manifested.

An anomaly identified by an iterator may be a rate of flushing a non-volatile log to a secondary storage. For example, an iterator on a namespace identifies the current size of the namespace's nvlog and the current rate of flushing the nvlog to a hard disc. A rate can be a measure, quantity, or frequency. A non-volatile log can be a type of computer record that can retain stored information even after power is removed. A secondary storage can be a non-volatile device used to retain data and programs for later retrieval.

After identifying an anomaly in a hierarchical data structure, an iterator stores a namespace annotation, about the anomaly, into an in-memory storage that is external to a file system, block 604. The system stores namespace annotations in memory that is external to a file system. By way of example and without limitation, this can include the read directory (readdir) operation storing a namespace annotation about the sparse directories in a namespace into a key value store.

In another example, a directory listing operation stores a namespace annotation about the sparse directories which qualify for compaction in a namespace into a key value store. In yet another example, a B+ tree iterator stores a namespace annotation about multiple nodes, in a namespace, requiring defragmentation, into a key value store. In an additional example, an iterator stores a namespace annotation about the current size of a namespace's nvlog and the current rate of flushing the nvlog to a hard disc, into a key value store. An in-memory storage can be a part of a computer in which data or program instructions can be retained with minimal response times by eliminating the need to access a disk.

Following the storing of a namespace annotation, about an anomaly, into an in-memory storage that is external to a file system, an asynchronous agent in the file system identifies the namespace annotation, about the anomaly, which is stored in the in-memory storage, thereby enabling the asynchronous agent to correct the anomaly, block 606. The system enables an agent to correct an anomaly by retrieving the related namespace annotation. An asynchronous agent may be associated with a directory caching service that confirms that a sparse directory is still sparse, and that caches a sparse directory in a directory cache. In embodiments, this can include the directory caching service accessing a key value store, identifying the namespace annotation about sparse directories in a namespace, and correcting the anomaly by caching the sparse directories into a directory cache.

A directory caching service can be software that performs automated tasks associated with an auxiliary_memory from which a file system cataloging structure, which contains references to other computer files, may be retrieved at a high speed. Sparse can be thinly dispersed or scattered. A directory cache can be an auxiliary_memory from which a file system cataloging structure, which contains references to other computer files, may be retrieved at a high speed.

An asynchronous agent may be associated with a compaction service that confirms that a sparse directory is still sparse, determines whether a total number of pages confirmed as sparse exceeds a threshold that qualifies the sparse directory as a compaction candidate, and then compacts data in pages in the sparse directory that qualifies as the compaction candidate. For example, a compaction service accesses a key value store, confirms that the sparse directories are still sparse, determines that the number of pages confirmed as sparse are sufficient to justify compacting, and corrects the anomaly by compacting data in pages in the sparse directories. A compaction service can be software that performs automated tasks that make something become denser.

A total number can be an arithmetical value, expressed by a word, symbol, or figure, representing aggregation or accumulation. A page can be a logical unit of data storage. A threshold can be a particular quantity that must be exceeded for a certain reaction, phenomenon, result, or condition to occur or be manifested. A compaction candidate can be a thing regarded as suitable for or likely to receive a particular treatment to be made denser. Data can be the quantities, characters, or symbols on which operations are performed by a computer, being stored and transmitted in the form of electrical signals and recorded on magnetic, optical, or mechanical recording media.

An asynchronous agent may be associated with a locality repair service which defragments a directory of fragmented nodes. For example, a locality repair service accesses a key value store, and corrects an anomaly by defragmenting directories of fragmented nodes. A locality repair service can be software that performs automated tasks associated with defragmenting a computer file.

An asynchronous agent may be associated with a machine-learning system that identifies a time-based pattern for a rate of flushing a non-volatile log and predicts an optimal size for the non-volatile log which supports the identified time-based pattern for flushing the non-volatile log. For example, a machine-learning system accesses a key value store, and corrects an anomaly by using the time-based pattern for the rate of flushing a non-volatile log to predict the optimal size for the non-volatile log at various times. An asynchronous agent can be an entity that interacts with a system on behalf of another entity, but not at any predetermined time or interval.

A machine-learning system can be an algorithm that leverages data to improve performance on some set of tasks. A time-based pattern can be an intelligible sequence of some things that should happen or be done which is discernible in certain actions or situations. An optimal size can be a storage space magnitude that is most favorable for a situation. An identified time-based pattern can be a selection of an intelligible sequence of some things that should happen or be done, which is discernible in certain actions or situations.

Having enabled an asynchronous agent to correct an anomaly, a namespace annotation is removed from the in-memory storage, block 608. The system makes room in a key value store for subsequent namespace annotations. By way of example and without limitation, this can include the directory caching service, the compaction service, the locality repair service, and/or the machine-learning system deleting their corresponding namespace annotations from a key value store.

Although FIG. 6 depicts the blocks 602-608 occurring in a specific order, the blocks 602-608 may occur in other orders. In other implementations, each of the blocks 602-608 may also be executed concurrently and/or in combination with other blocks and/or some blocks may be divided into a distinct set of blocks.

Exemplary Computing System

Figure 7:
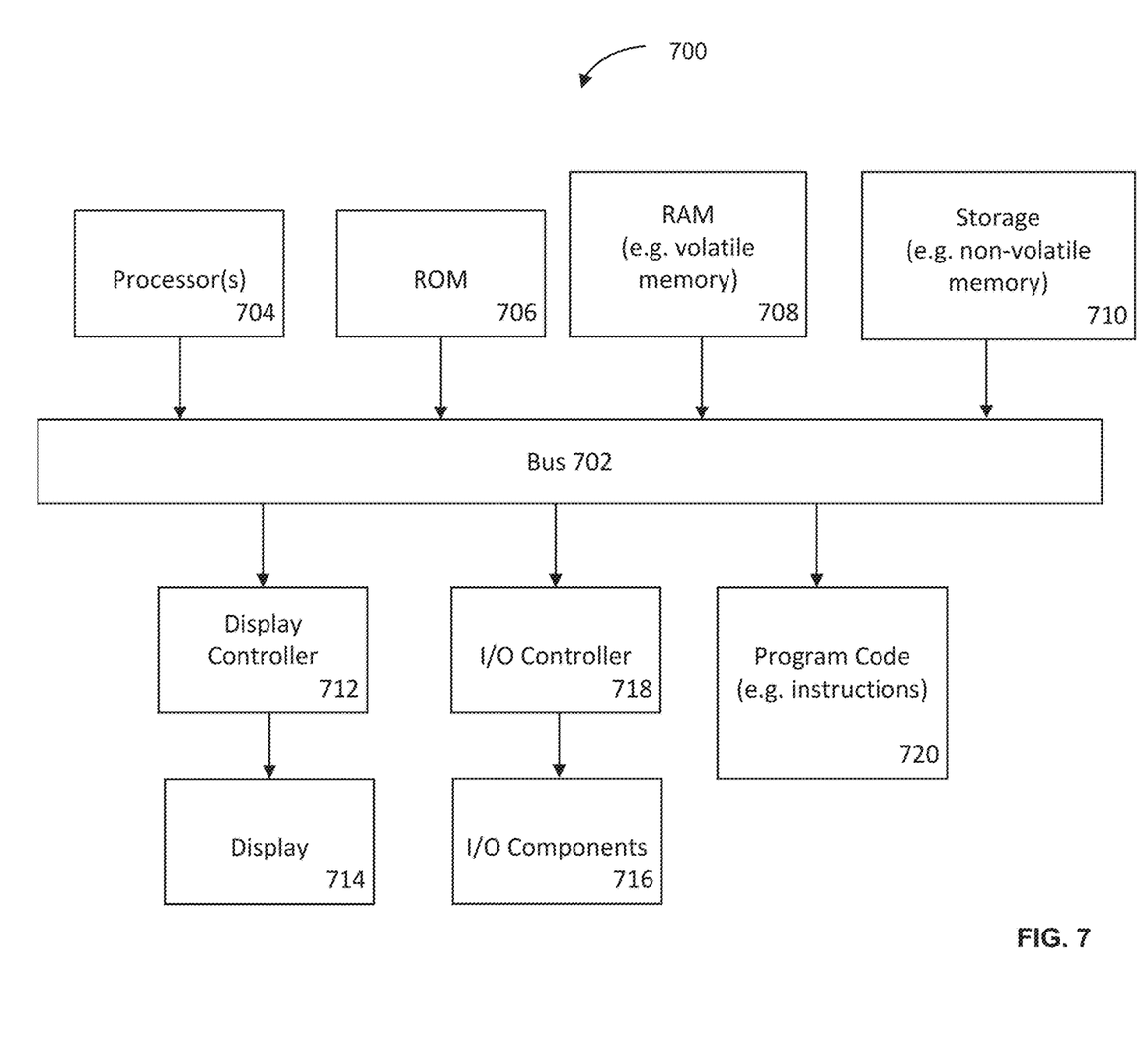
FIG. 7 is a block diagram illustrating an example computing system for delivering file system namespace features without on-disk layout changes according to one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 702 which may be coupled to a processor 704, ROM (Read Only Memory) 706, RAM (or volatile memory) 708, and storage (or non-volatile memory) 710. The processor(s) 704 may retrieve stored instructions from one or more of the memories 706, 708, and 710 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 704 may perform operations in an on-demand or "cloud computing" environment or as a service, such as within a "software as a service" (SaaS) implementation. Accordingly, the performance of operations may be distributed among the one or more processors 704, whether residing only within a single machine or deployed across a number of machines. For example, the one or more processors 704 may be located in a single geographic location (such as within a home environment, an office environment, or a server farm), or may be distributed across a number of geographic locations.

The RAM 708 may be implemented as, for example, dynamic RAM (DRAM), or other types of memory that require power continually in order to refresh or maintain the data in the memory. Storage 710 may include, for example, magnetic, semiconductor, tape, optical, removable, non-removable, and other types of storage that maintain data even after power is removed from the system. It should be appreciated that storage 710 may be remote from the system, such as accessible via a network.

A display controller 712 may be coupled to the bus 702 in order to receive display data to be displayed on a display device 714, which can display any one of the user interface features or embodiments described herein and may be a local or a remote display device. The computing system 700 may also include one or more input/output (I/O) components 716 including mice, keyboards, touch screen, network interfaces, printers, speakers, and other devices. Typically, the input/output components 716 are coupled to the system through an input/output controller 718.

Program code 720 may represent any of the instructions, applications, software, libraries, toolkits, modules, components, engines, units, functions, logic, etc. as described herein. Program code 720 may reside, completely or at least partially, within the memories described herein (such as non-transitory computer-readable media), or within a processor during execution thereof by the computing system. Program code 720 may include both machine code, such as produced by a compiler, and files containing higher-level or intermediate code that may be executed by a computing system or other data processing apparatus (or machine) using an interpreter. In addition, program code 720 may be implemented as software, firmware, or functional circuitry within the computing system, or as combinations thereof. Program code 720 may also be downloaded, in whole or in part, through the use of a software development kit or toolkit that enables the creation and implementation of the described embodiments.

Moreover, any of the disclosed embodiments may be embodied in distinct types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for delivering file system namespace features without on-disk layout changes, comprising:
   one or more processors; and
   a non-transitory computer readable medium storing a plurality of instructions, which when executed, cause the one or more processors to:
   identify, by an iterator in a file system, an anomaly in a hierarchical data structure, which includes a root node at a highest level in a file set, which includes directories of connected nodes corresponding to other levels in the file set, and which includes leaf nodes at a lowest level in the file set;
   store, by the iterator, an annotation, about the anomaly, into an in-memory storage that is external to the file system; and
   identify, by an asynchronous agent in the file system, the annotation, about the anomaly, which is stored in the in-memory storage, thereby enabling the asynchronous agent to correct the anomaly.

2. The system of claim 1, wherein the anomaly identified by the iterator is a sparse directory, and the asynchronous agent is associated with a directory caching service that confirms that the sparse directory is still sparse, and that caches the sparse directory in a directory cache.

3. The system of claim 1, wherein the anomaly identified by the iterator is a sparse directory, and the asynchronous agent is associated with a compaction service that confirms that the sparse directory is still sparse, determines whether a total number of pages confirmed as sparse exceeds a threshold that qualifies the sparse directory as a compaction candidate, and then compacts data in pages associated with the sparse directory that qualifies as the compaction candidate.

4. The system of claim 1, wherein the anomaly identified by the iterator is a directory of fragmented nodes, which are identified for defragmentation based on each number of nodes read from the directory of fragmented nodes for each read operation compared to a threshold number, and the asynchronous agent is associated with a locality repair service which defragments the directory of fragmented nodes.

5. The system of claim 1, wherein the anomaly identified by the iterator is a rate of flushing a non-volatile log, to a secondary storage, and the asynchronous agent is associated with a machine-learning system that identifies a time-based pattern for the rate of flushing the non-volatile log and predicts an optimal size for the non-volatile log which supports the identified time-based pattern for flushing the non-volatile log.

6. The system of claim 1, wherein the plurality of instructions further causes the processor to remove the annotation, about the anomaly, from the in-memory storage.

7. The system of claim 1, wherein the hierarchical data structure is implemented as one of a Merkle tree or a B+ tree.

8. A computer program product comprising a non-transitory computer-readable medium having a computer-readable program code embodied therein to be executed by one or more processors, the program code including instructions to:
   identify, by an iterator in a file system, an anomaly in a hierarchical data structure, which includes a root node at a highest level in a file set, which includes directories of connected nodes corresponding to other levels in the file set, and which includes leaf nodes at a lowest level in the file set;

store, by the iterator, an annotation, about the anomaly, into an in-memory storage that is external to the file system; and identify, by an asynchronous agent in the file system, the annotation, about the anomaly, which is stored in the in-memory storage, thereby enabling the asynchronous agent to correct the anomaly.

9. The computer program product of claim 8, wherein the iterator identifies a sparse directory as the anomaly, and the asynchronous agent is associated with a directory caching service that confirms that the sparse directory is still sparse, and that caches the sparse directory in a core directory cache.

10. The computer program product of claim 8, wherein the iterator identifies at least one sparse directory as the anomaly, counts a total number of pages corresponding to each of the at least one sparse directory, wherein each of the total number of pages is compared against a threshold to determine if any of the at least one sparse directory is at least one compaction candidate, the asynchronous agent is associated with a compaction service that confirms that the at least one sparse directory is sparse and the at least one compaction candidate, and then performs the compacting of data in pages associated with the at least one sparse directory.

11. The computer program product of claim 8, wherein the iterator identifies a directory of pages that require locality repair as the anomaly, and the asynchronous agent is associated with a locality repair service which defragments the directory of pages that require locality repair.

12. The computer program product of claim 8, wherein the iterator identifies a rate of flushing a non-volatile log to permanent memory as the anomaly, and the asynchronous agent is associated with a machine-learning system that identifies a time-based pattern for flushing the non-volatile log and that predicts an optimal change in size of the non-volatile log for the identified time-based pattern for flushing the non-volatile log.

13. The computer program product of claim 8, wherein the program code includes further instructions to remove the annotation, about the anomaly, from the in-memory storage.

14. The computer program product of claim 8, wherein the hierarchical data structure is implemented as one of a Merkle tree or a B+ tree.

15. A computer-implemented method for delivering file system namespace features without on-disk layout changes, comprising:

identifying, by an iterator in a file system, an anomaly in a hierarchical data structure, which includes a root node at a highest level in a file set, which includes directories of connected nodes corresponding to other levels in the file set, and which includes leaf nodes at a lowest level in the file set;

storing, by the iterator, an annotation, about the anomaly, into an in-memory storage that is external to the file system; and identifying, by an asynchronous agent in the file system, the annotation, about the anomaly, which is stored in the in-memory storage, thereby enabling the asynchronous agent to correct the anomaly.

16. The computer-implemented method of claim 15, wherein the iterator identifies a sparse directory as the anomaly, and the asynchronous agent is associated with a directory caching service that confirms that the sparse directory is still sparse, and that caches the sparse directory in a core directory cache.

17. The computer-implemented method of claim 15, wherein the iterator identifies at least one sparse directory as the anomaly, counts a total number of pages corresponding to each of the at least one sparse directory, wherein each of the total number of pages is compared against a threshold to determine if any of the at least one sparse directory is at least one compaction candidate, the asynchronous agent is associated with a compaction service that confirms that the at least one sparse directory is sparse and the at least one compaction candidate, and then performs the compacting of data in pages associated with the at least one sparse directory.

18. The computer-implemented method of claim 15, wherein the iterator identifies a directory of pages that require locality repair as the anomaly, and the asynchronous agent is associated with a locality repair service which defragments the directory of pages that require locality repair.

19. The computer-implemented method of claim 15, wherein the iterator identifies a rate of flushing a non-volatile log to permanent memory as the anomaly, and the asynchronous agent is associated with a machine-learning system that identifies a time-based pattern for flushing the non-volatile log and that predicts an optimal change in size of the non-volatile log for the identified time-based pattern for flushing the non-volatile log.

20. The computer-implemented method of claim 15, wherein the computer-implemented method further comprises removing the annotation, about the anomaly, from the in-memory storage.

* * * * *